United States Patent [19]

Rees

[11] Patent Number: 4,881,775
[45] Date of Patent: * Nov. 21, 1989

[54] RECLINING SEAT BACK APPARATUS AND METHOD OF UTILIZATION THEREOF

[75] Inventor: Richard W. A. Rees, Holland Landing, Canada

[73] Assignee: General Motors Corporation, Detroit, Mich.

[*] Notice: The portion of the term of this patent subsequent to Apr. 25, 2006 has been disclaimed.

[21] Appl. No.: 304,436

[22] Filed: Feb. 1, 1989

Related U.S. Application Data

[63] Continuation of Ser. No. 154,756, Feb. 11, 1988.

[51] Int. Cl.⁴ ............................ A47C 1/00; B60N 1/02
[52] U.S. Cl. ........................................ 297/361; 297/374
[58] Field of Search ................ 297/561, 374, 375, 355

[56] References Cited

U.S. PATENT DOCUMENTS

| | | | |
|---|---|---|---|
| 2,998,281 | 8/1961 | Stoner et al. | 297/374 |
| 3,339,975 | 9/1967 | Posh | 297/361 |
| 3,356,411 | 12/1967 | Homier et al. | 297/374 |
| 3,369,841 | 2/1968 | Heyl, Jr. | 297/361 |
| 3,398,986 | 8/1968 | Homier | 297/361 |
| 4,669,781 | 6/1987 | Convoy et al. | 297/355 |

FOREIGN PATENT DOCUMENTS 261233 11/1926 United Kingdom ............... 297/375

Primary Examiner—Francis K. Zugel
Attorney, Agent, or Firm—Ernest E. Helms

[57] ABSTRACT

The present invention provides an apparatus and method of utilization of the same of a vehicle seat recliner seat latch for setting the inclination of a vehicle seat back. An embodiment of the present invention includes a threaded rod pivotally mounted with respect to the seat. A sleeve is threadably connected on the rod and has pivotal means of connection with the seat back along a pivotal axis fixed with respect to the seat back. A locking means is provided to engage the sleeve to selectively and incrementally restrain the sleeve from rotation on the rod to set the inclination of the seat back. When the locking means is not engaged with the sleeve, the inclination of the seat back can be adjusted.

1 Claim, 3 Drawing Sheets

1

RECLINING SEAT BACK APPARATUS AND METHOD OF UTILIZATION THEREOF

This is a division of application Ser. No. 154,756 filed on Feb. 11, 1988.

FIELD OF THE INVENTION

The field of the present invention is that of vehicle seats. More particularly, the field of the present invention is that of adjuster latches for vehicle recliner seats and methods of the utilization of the same.

DISCLOSURE STATEMENT

It is known in the art to provide seats with reclining seat backs in automotive vehicles. One type of a recliner adjuster seat latch typically relies on some type of a frictional engagement locking mechanism to set the inclination of the seat back. Another type of recliner seat latch relies upon an incremental engagement locking mechanism to set the inclination of the seat back.

An advantage of the frictional engaging type locking mechanism is that the adjustment potential is infinitely variable. However, the reliance upon frictional engagement is usually undesirable due to wear and/or erosion of the locking mechanism which over time may cause the locking mechanism to possibly malfunction and require replacement. Incremental type recliner latches typically have a longer life. However the definition of adjustment of incremental recliner latches is often not as fine as desired.

SUMMARY OF THE INVENTION

The present invention provides a seat adjuster latch which is an alternative to prior incremental reclining seat adjuster latches. The present invention in a preferred embodiment provides a threaded rod pivotally mounted with respect to the seat along an axis separate of that of the pivotal axis of the seat back with the seat cushion. Threaded on the rod is a sleeve. The helix angle of the rod is quite steep. Therefore, it is fairly easy to make the sleeve rotate up or down the rod by providing a force upon the sleeve parallel to the axis of the rod. The sleeve is held by a two piece bearing which is pivotally mounted in an aperture of the seat back along a pivotal axis fixed with respect to the seat back. On the outer diameter of the sleeve is a series of gear-like teeth. A spring biased slider engages with the teeth preventing th sleeve from rotating. The fixation of the sleeve on the rod sets the effective length of the rod. Therefore a triangular linkage exists which is turn sets the inclination of the seat.

An advantage of the present invention is that it provides a design which can give very small incremental changes in the inclination of the seat. The finite adjustment of the inclination of the seat back provided by the present invention was previously for practical purposes, only available with infinitely adjustable type recliner seat latches. Another advantage of the present invention is that it provides a seat latch design more suitable for fabrication out of polymeric materials instead of mandating the use of metallic materials. Furthermore, another advantage of the present invention is that it is ideally suited for recliner seats which also have mechanisms to allow the seat back to be pivoted forward allowing ingress to the rear row seating of a conventional two-door automotive vehicle.

Furthermore, the present inventive recliner seat latch is advantageous in that its design is compatible with many recliner seats presently in production. Additionally, the seat adjuster latch of the present invention is extremely light and can be placed in a very thin space envelope of the vehicle seat.

Still another advantage of the present invention is that the manually operable handle which controls the recliner seat adjuster latch can be remotely located from the seat adjuster latch. With the above being true the ergometrics of the placement of the release handle can be maximized. Many prior seat adjuster latches required the release handle to be directly connected to or to be in close proximity to the locking mechanism of the seat adjuster latch.

It is an object of the present invention to provide a vehicle recliner seat adjuster latch apparatus and a method of utilization of the same.

It is an object of the present invention to provide a vehicle seat recliner seat latch for setting the inclination of a seat back pivotally mounted with respect to a seat cushion along a first pivotal axis, the latch including a threaded rod pivotally mounted with respect to the seat cushion along a second axis generally parallel with the first axis, a sleeve threadably connected on the rod having pivotal means of connection with the seat back along a third pivotal axis fixed with respect to the seat back, and locking means having a selectively incrementally engaged position and a non-engaged position with respect to the sleeve, whereby the locking means in the engaged position restrains the sleeve from rotation on the rod to set the inclination of the seat back, and the locking means in the non-engaged position allows rotation of the sleeve on the rod to adjust the inclination of the seat back.

It is an object of the present invention to provide a vehicle seat recliner seat latch for setting the inclination of a seat back having an aperture and being pivotally mounted with respect to a seat cushion along a first pivotal axis, the seat latch including a threaded rod pivotally mounted with respect to the seat cushion along a second pivotal axis generally parallel with the first axis, a sleeve threadably connected on the rod with exterior gear teeth, bearing means capturing the sleeve and being pivotally mounted in the aperture of the seat back along a third pivotal axis fixed with respect to the seat back, a first spring encircling the rod and captured between the second pivotal axis and the third pivotal axis urging the seat back away from the second pivotal axis and biasing the seat back towards an upright position, a second spring having a fixed position with respect to the seat back and a slider having an incline slot and being mounted by the inclined slot along rod fixed with respect to the seat back, whereby the slider is biased by the second spring into a position to selectively incrementally engage with the gear teeth of the sleeve for restraining the sleeve from rotating on the rod to set the inclination of the seat back and whereby the slider is connected with a release cable to pull the slider away from engaging with the sleeve to allow the adjusting of the inclination on the seat back.

It is an object of the present invention to provide a method of setting the inclination of a seat back pivotally mounted with respect to a seat cushion along a first pivotal axis, the method including pivotally mounting with respect to the seat cushion a threaded rod along a second pivotal axis generally parallel with the first pivotal axis, threadably connecting on the rod a sleeve, pivotally connecting the sleeve to the seat back along a third pivotal axis fixed with respect to the seat back, selectively and incrementally engaging the sleeve for restraining the sleeve from rotating on the rod whereby setting the inclination of the seat back, and releasing the sleeve for rotation on the rod for adjusting the inclination of the seat back.

Other objects and advantages of the present invention can be more apparent to those skilled in the art as the nature of the invention is better understood from a review of the accompanying drawings and a detailed description.

DETAILED DESCRIPTION OF THE DRAWINGS

Figure 1:
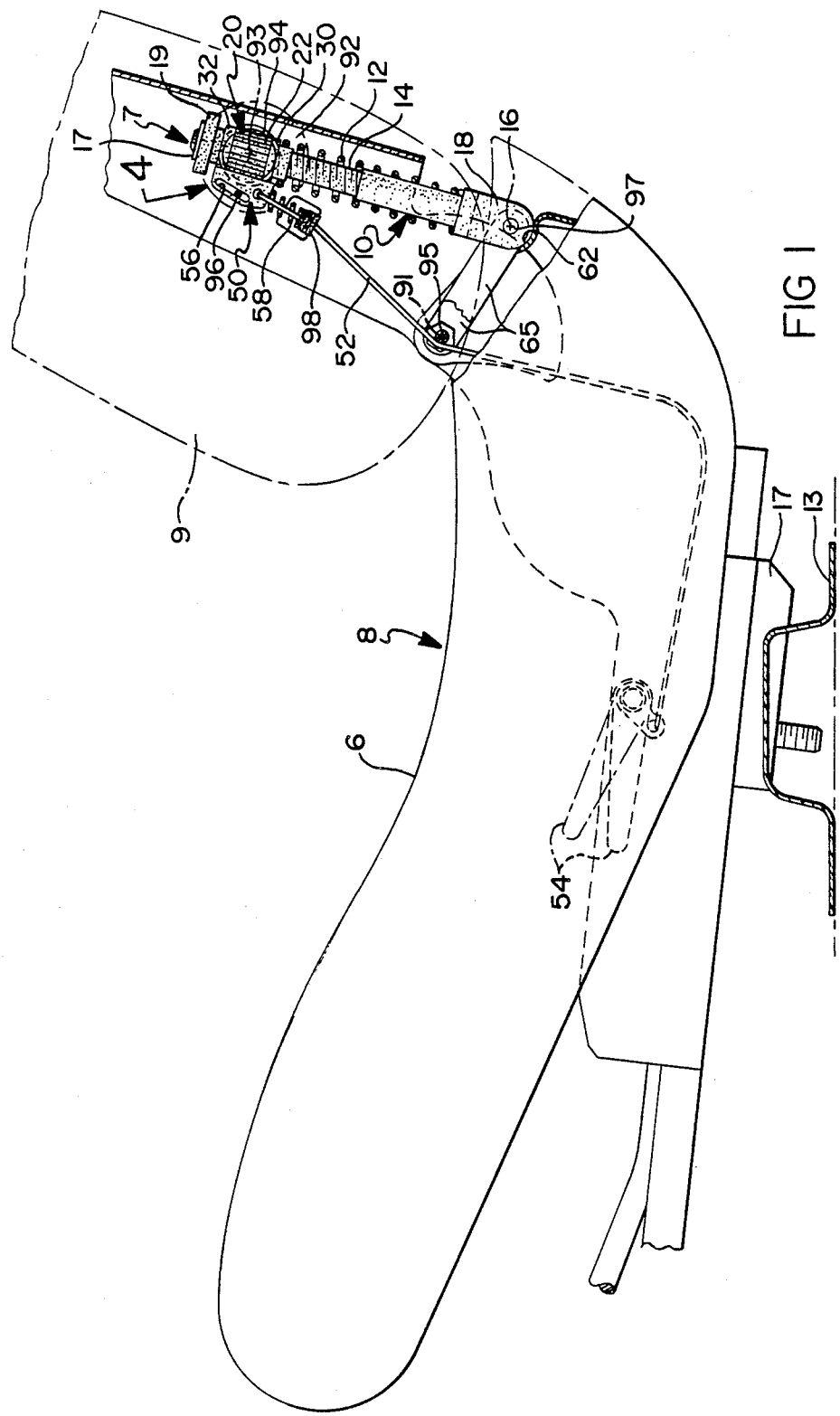
FIG. 1 a side elevational view of a preferred embodiment recliner seat adjuster latch of the present inventi installed within a vehicle seat.

Referring to FIGS. 1-5, the reclining vehicle seat 8 has a seat cushion 6 and a seat back 9. The seat cushion is attached to the vehicle floor 13 via a fore and aft seat adjuster 17. To adjust the inclination of seat back 9 there is provided a recliner seat adjuster latch 7.

The seat back 9 is pivotally mounted with respect to the seat cushion 6 along a first pivotal axis 91. Usually placed within the interior of the seat back 9 is a frame member 92 fabricated from two parallel sheet metal pieces fixably connected together. In some applications, it will be desirable for the seat back 9 to have two fabricated frame members, one for both the inboard and outboard sides of the seat 8, parallel spaced from one another to give seat back 9 added strength. Pivotal axis 91 runs along pin 95. Pin 95 also pivotally mounts a link 65.

A rod 10 has two ears 18. Via ears 18 the rod 10 is pivotally mounted with respect to the seat cushion 6 and with respect to the link 65. The second pivotal axis 16 of the rod is generally parallel with the pivotal axis 91 and is co-linear with pin 97. The rod 10 also has at its upper end a threaded portion 14.

Encircling the rod 10 and threadably connected thereto is a sleeve 20. The sleeve 20 along an outer periphery has a series of gear teeth 22 (FIG. 5) preferably axially aligned with the rod 10. The helical angle of the threads of the rod 10 and sleeve 20 are inclined at a relatively steep angle such that a force placed on the sleeve in a direction generally axially with respect to the rod 10 will cause the sleeve to freely rotate on and translate up and down the rod 10. It has been found preferable to keep the helix angle of the rod between 23 and 34 degrees.

Capturing the sleeve are lower 30 and upper 32 bearings. The lower 30 and upper 32 bearings provide the means of pivotal connection of the sleeve 20 with the seat back 9. The upper and lower bearing members are inserted within the circular flared aperture 94 of the seat back frame members 92 thereby providing sleeve 20 with a third pivotal axis 93 fixed with respect to the seat back 9.

To allow adjustment in the inclination of the seat back 9 or alternatively to set the inclination of the seat back 9, there is provided a locking means to selectively and incrementally restrain the sleeve 20 from rotation on the rod 10. The locking means includes a rod 96, a slider 50 having incline slot 56. The locking means also includes a second spring 58 mounted on a base 98 fixed with respect to the seat back frame 92. Additionally, the locking mechanism includes cable 52 which is in turn controlled by a remotely located operator actuated release handle 54.

Figure 2:
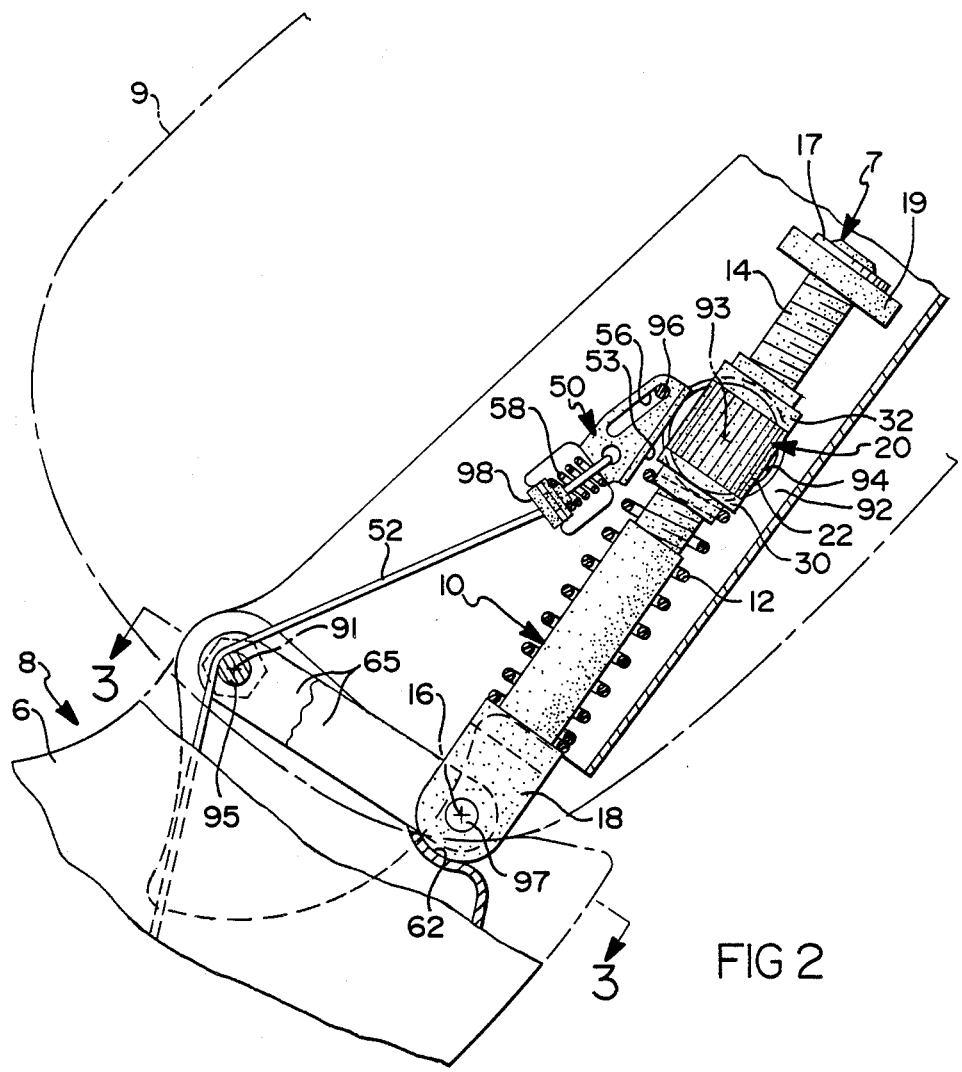
FIG. 2 an enlarged view of the recliner seat latch shown in FIG. 1 with the seat back in a reclined position latch in a released position.
Figure 3:
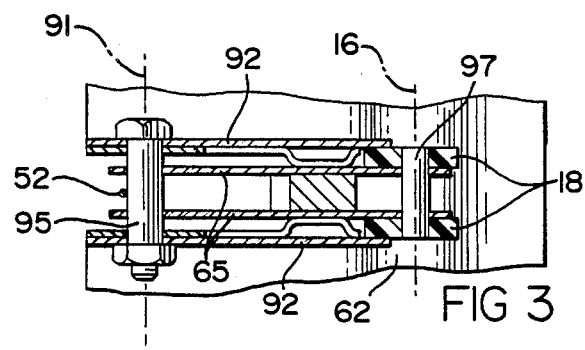
FIG. 3 is view taken along line 3—3 of FIG. 2.
Figure 4:
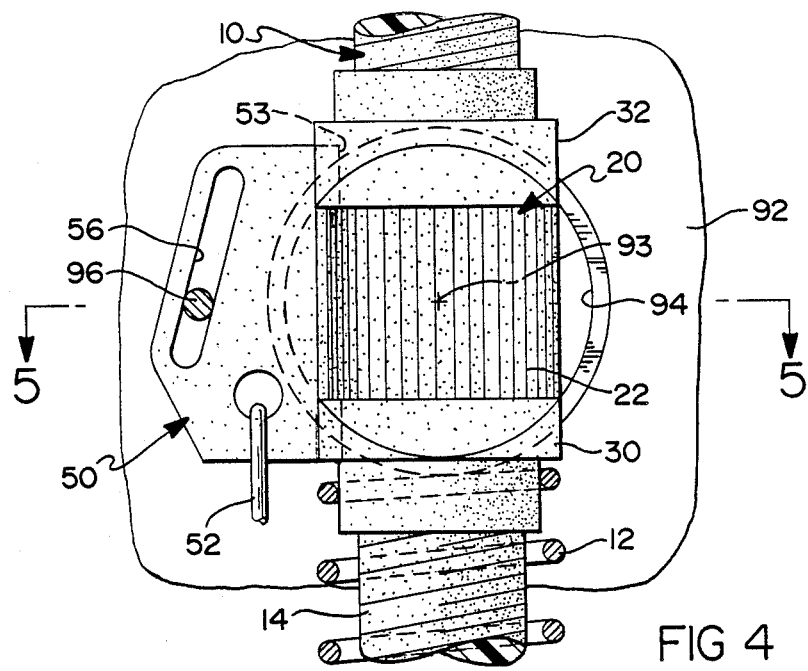
FIG. 4 is an enlarged view of the portion encircled in FIG. 1.
Figure 5:
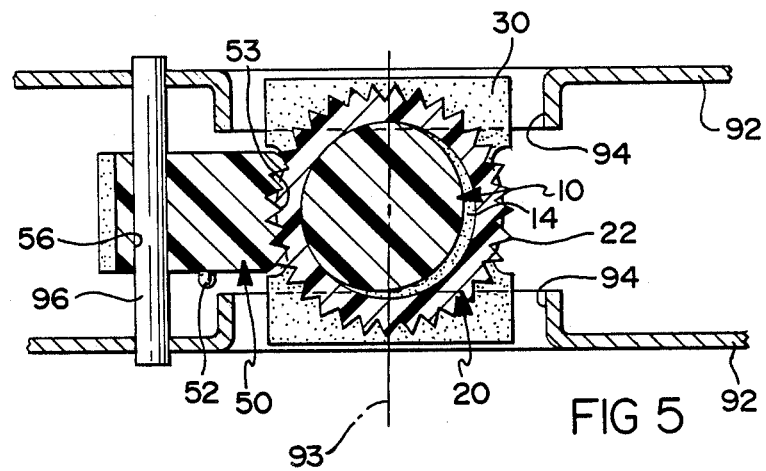
FIG. 5 a view taken along line 5—5 of FIG. 4.

The second spring 58 biases the slider into a position to place gear teeth 53 of the slider into engagement with slide teeth 22 (FIG. 5). When the slider teeth 53 are engaged with the sleeve teeth 22, the sleeve 20 is restrained from rotation. Therefore, the effective length of rod 10 is set and there is a triangular linkage of the rod 10, the link 65 and the frame member 92 which sets the inclination of the seat back 9. To adjust the inclination of the seat back 9, manual actuator 54 is pulled causing a tension force on cable 52. Cable 52 pulls on slider 50 to compress second spring 58. The rod 96 is fixed with respect to the seat back frame 92. Due to the inclination of slot 56 a pull on cable 52 will cause the slider teeth 53 to pull away from engagement with the sleeve teeth 22 as best illustrated in FIG. 2. At this point, the seat back 9 can be adjusted to a new desired inclination and the sleeve 20 will automatically rotate on the rod 10. Upper and lower bearings 32 and 30 allow the sleeve 20 to pivot with respect to the seat back frame 92 along pivotal axis 93. A release of manual actuator 54 will allow second spring 58 to urge slider 50 back into a position of engagement with slider 20 to reset the inclination of the seat.

A first spring 12 encircling rod 10 captured between the second pivotal axis 16 and the third pivotal axis 93 urges the seat back (via the flared aperture 94) away from pivotal axis 16. The above action biases seat back 9 to an upright position. To keep the biased forward movement of the seat back frame 92 causing the sleeve 20 to rotate off the rod 10 an end stop 17 is provided. To cushion any sudden impact, an elastomeric buffer 19 is also provided.

The present invention provides an adjuster which provides rather fine adjustment due to the helix angle on the rod 10 and the plurality of teeth 22 on the sleeve 20. It has been found that a rod with a threaded helix angle of approximately 23 degrees with a 4 mm pitch, and a sleeve with 45 teeth will yield a 0.36 degree interval of adjustment for the seat back. A helix angle of 33.55 degrees yields a 0.56 interval of adjustment. In both of the above cases the increment of adjustment from a seat occupant's standpoint is excellent and approaches a level of adjustment previously only available in infinitely variable seat recliner latches.

The forces transmitted in the present invention are of such a low magnitude that it has been found that the rod 10, lower 30 and upper 32 bearings, sleeve 20 and slider 50 can be made of a polymeric material. The use of nylon/acetal material has been found to be particularly useful. If loading of latch 7 is greater than desired, the seat back 9 design can be provided with two latches 7 mounted parallel with the interior of a seat back 9. A common release cable which branches off can be utilized to control both sliders 50.

The design of seat latch 7 also is advantageous when being utilized with seat back 9 which also pivot forward along axis 91, typically in two-row two-door vehicles (coupes). To pull the seat forward a latching mechanism (not shown) is released and the whole seat back 9 pivots forward via pivotal axis 91 on pin 95. Rod 10 which is sitting on dimple 62 of the seat cushion just lifts and moves along with link 65.

The present invention provides a method of setting the inclination of a seat back 9 pivotally mounted with respect to a seat 6 cushion along a first pivotal axis 91, the method including the following steps:

1. Pivotally mounting with respect to the seat cushion 6 a threaded rod 10 along a second pivotal axis 16 generally parallel with the first pivotal axis 91;
2. Threadably connecting on the rod 10 a sleeve 20;
3. Pivotally connecting the sleeve 20 to the seat back 9 along a third pivotal axis 93 fixed with respect to the seat back 9;
4. Selectively and incrementally engaging the sleeve 20 for restraining the sleeve 20 from rotating on rod 10 whereby setting the inclination of the seat back 9; and
5. Releasing the sleeve 20 for rotation on the rod 10 for adjusting the inclination of the seat back 10.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat recliner seat latch for setting the inclination of a seat back having an aperture and being pivotally mounted with respect to a seat cushion along a first pivotal axis, said seat latch in combination comprising:

A threaded rod pivotally mounted with respect to said seat cushion along a second pivotal axis generally parallel with said first axis;

a sleeve threadably connected on said rod with exterior gear teeth;

bearing means capturing said sleeve and being pivotally mounted in said aperture of said seat back along a third pivotal axis fixed with respect to said seat back;

a first spring encircling said rod and captured between said second pivotal axis and said third pivotal axis urging said seat back away from said second pivotal axis and biasing said seat back towards an upright position;

a second spring having a fixed position with respect to said seat back and a slider having an inclined slot and being mounted by said inclined slot along a rod fixed with respect to said seat back, whereby said slider is biased by said second spring into a position to selectively incrementally engage with said gear teeth of said sleeve for restraining said sleeve from rotating on said rod to set the inclination of said seat back and whereby said slider is connected with a release cable to pull said slider away from engaging with said sleeve to allow the adjusting of the inclination on said seat back.

* * * * *